US010726314B2

(12) United States Patent
Greenberger et al.

(10) Patent No.: US 10,726,314 B2
(45) Date of Patent: *Jul. 28, 2020

(54) SENTIMENT BASED SOCIAL MEDIA COMMENT OVERLAY ON IMAGE POSTS

(71) Applicant: International Business Machines Corporation, Armonk, NY (US)

(72) Inventors: Jeremy A. Greenberger, Raleigh, NC (US); Zachary M. Greenberger, Raleigh, NC (US); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/007,990

(22) Filed: Jun. 13, 2018

(65) Prior Publication Data
US 2018/0293468 A1 Oct. 11, 2018

Related U.S. Application Data

(63) Continuation of application No. 15/234,159, filed on Aug. 11, 2016, now Pat. No. 10,026,023.

(51) Int. Cl.
*G06K 9/00* (2006.01)
*G06K 9/72* (2006.01)
(Continued)

(52) U.S. Cl.
CPC ......... *G06K 9/726* (2013.01); *G06F 40/295* (2020.01); *G06F 40/30* (2020.01); *G06F 40/40* (2020.01);
(Continued)

(58) Field of Classification Search
None
See application file for complete search history.

(56) References Cited

U.S. PATENT DOCUMENTS 9,210,313 B1 * 12/2015 Svendsen ............... G06F 16/50
9,336,268 B1 * 5/2016 Moudy ................... G06F 40/30
(Continued)

FOREIGN PATENT DOCUMENTS

JP 2003230088 A * 8/2003

OTHER PUBLICATIONS

Beautiful picture of an ugly place. Exploring photo collections using opinion and sentiment analysis of user comments, Slava Kisilevich et al., IEEE, 978-83-60810-27-9, 2010, pp. 419-428 (Year: 2010).*

(Continued)

*Primary Examiner* — Jayesh A Patel
(74) *Attorney, Agent, or Firm* — Garg Law Firm PLLC; Rakesh Garg; Michael O'Keefe

(57) ABSTRACT

By performing Natural Language Processing (NLP) on a comment to a social media post, an entity that is referenced in the comment is extracted. The entity is an object other than a human face that is depicted in an image in the post. The image is analyzed to determine whether the entity is represented in the image. When the entity is represented in the image, a sentiment value of the comment is computed relative to the entity. A value corresponding to the sentiment value is assigned to a characteristic of a graphical artifact. A position is determined relative to an area occupied by the entity in the image. The graphical artifact is caused to be overlaid on the image at the position and with the value of the characteristic.

20 Claims, 6 Drawing Sheets

US 10,726,314 B2
Page 2

(51) Int. Cl.
*G06T 11/60* (2006.01)
*G06T 11/00* (2006.01)
*G06Q 50/00* (2012.01)
*G06K 9/32* (2006.01)
*G06Q 30/02* (2012.01)
*G06F 40/30* (2020.01)
*G06F 40/40* (2020.01)
*G06F 40/295* (2020.01)

(52) U.S. Cl.
CPC ....... *G06K 9/00456* (2013.01); *G06K 9/3233* (2013.01); *G06Q 30/0201* (2013.01); *G06Q 50/01* (2013.01); *G06T 11/001* (2013.01); *G06T 11/60* (2013.01); *G06T 2207/20092* (2013.01); *G06T 2207/20212* (2013.01)

(56) References Cited

U.S. PATENT DOCUMENTS

| | | | | |
|---|---|---|---|---|
| 10,026,023 | B2* | 7/2018 | Greenberger | G06K 9/726 |
| 2004/0235460 | A1* | 11/2004 | Engstrom | G06Q 30/02 455/414.1 |
| 2007/0115256 | A1* | 5/2007 | Lee | G11B 27/034 345/156 |
| 2007/0245243 | A1* | 10/2007 | Lanza | G06Q 30/0277 715/723 |
| 2008/0001945 | A1* | 1/2008 | Kashito | G11B 27/034 345/418 |
| 2009/0319291 | A1* | 12/2009 | Noordvyk | G06Q 50/22 705/2 |
| 2010/0135562 | A1* | 6/2010 | Greenberg | G06F 19/321 382/131 |
| 2010/0306645 | A1* | 12/2010 | Roulland | H04N 1/00474 715/271 |
| 2011/0071757 | A1* | 3/2011 | Lee | G01C 21/3492 701/532 |
| 2011/0128295 | A1* | 6/2011 | Kimoto | G06F 16/33 345/589 |
| 2011/0145219 | A1* | 6/2011 | Cierniak | H04L 67/42 707/709 |
| 2011/0211728 | A1* | 9/2011 | Inose | G06Q 10/10 382/100 |
| 2012/0147053 | A1* | 6/2012 | Yamamoto | G06T 11/60 345/667 |
| 2012/0151347 | A1* | 6/2012 | McClements, IV | G11B 27/034 715/716 |
| 2012/0221687 | A1* | 8/2012 | Hunter | G06F 16/435 709/219 |
| 2013/0031475 | A1* | 1/2013 | Maor | G06Q 10/10 715/706 |
| 2013/0101220 | A1* | 4/2013 | Bosworth | G06K 9/6201 382/195 |
| 2013/0317808 | A1* | 11/2013 | Kruel | H04L 51/32 704/9 |
| 2014/0019264 | A1* | 1/2014 | Wachman | G06Q 30/0276 705/14.72 |
| 2014/0055553 | A1* | 2/2014 | Lee | G06K 9/00288 348/14.07 |
| 2014/0115459 | A1* | 4/2014 | Norwood | G06F 3/0484 715/708 |
| 2015/0052479 | A1* | 2/2015 | Ooi | G06F 3/04815 715/810 |
| 2015/0062114 | A1* | 3/2015 | Ofstad | G06T 19/006 345/419 |
| 2015/0073775 | A1* | 3/2015 | Skiba | G06F 17/10 704/9 |
| 2015/0112753 | A1* | 4/2015 | Suvarna | G06Q 30/0201 705/7.29 |
| 2016/0189407 | A1* | 6/2016 | Hodgson | G06T 11/60 715/204 |
| 2016/0275372 | A1* | 9/2016 | Goodwin | G06F 16/583 |
| 2017/0046601 | A1* | 2/2017 | Chang | G06Q 30/0269 |
| 2017/0098170 | A1* | 4/2017 | Sardela Bianchi | G06Q 30/0601 |
| 2017/0132676 | A1* | 5/2017 | Mediratta | G06Q 30/0282 |
| 2017/0364600 | A1* | 12/2017 | Sadauskas, Jr. | G06F 16/248 |

OTHER PUBLICATIONS

Enhanced Sentiment Learning Using Twitter Hashtags and Smileys, Dmitry Davidov et al. ICNC, 2010, pp. 241-249 (Year: 2010).*
List of IBM Patents or Applications Treated as Related, 2018.

* cited by examiner

SENTIMENT BASED SOCIAL MEDIA COMMENT OVERLAY ON IMAGE POSTS

TECHNICAL FIELD

The present invention relates generally to a method, system, and computer program product for relating comments made on social media to contents of posted images. More particularly, the present invention relates to a method, system, and computer program product for sentiment based social media comment overlay on image posts.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

A user's contributions or interactions with the social media can include any type or size of data. For example, a user can post text, pictures, videos, links, or combinations of these and other forms of information to a social media website. Furthermore, such information can be posted in any order, at any time, for any reason, and with or without any context. Thus, a user's interactions with a social media can be regarded as unstructured data.

For example, one user posts an image on social media. Another user reacts or interacts with that post by commenting about the image. For example, the reacting user may indicate a liking or dislike of certain items or entities that are depicted in the image.

Hereinafter, an item, object, place, or thing that is depicted in an image or video, and is not a person or a human face, is referred to herein as an entity. Still pictures, sketches, line-art, graphics, icons, video, and other similarly purposed graphical or visual data that can be posted on social media is collectively and interchangeably referred to herein as an "image".

A comment is textual data contributed by a social media user in the context of—i.e., in relation to—an image posted on the social media. For example, suppose an image posted by one user depicts a person in an office environment. As an example, a close friend's comment, "I like your hair" is in the context of the image because the comment relates to the hair of the person depicted in the image. The hair of the person is an entity as described herein. As another example, a friend's comment, "Hey, can we meet this weekend?" is not in the context of the image because the comment relates to the user who posted the image and not to an entity depicted in the image. As another example, a close friend's comment "I liked your other dress better" is in the context of the image because the comment relates to the person's depicted dress entity because the comment is comparing the depicted dress entity relative to another dress that need not be depicted in the image.

As another example, a friend's comment, "You seem to be liking working there" is in the context of the image because the comment relates to the identity badge that is depicted as attached to a belt the person in the image is wearing, or to a company logo that may be in the background of the image. The badge and the logo are entities as described herein. Other non-limiting examples of entities that provide context to the comments can generally be any inanimate objects, foreground objects, background objects, colors, and shapes other than human faces.

The comments are expressed in a natural language. A natural language is a written or a spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a social media post or human speech, and produce structured data—such as an outline of the input content, most significant and least significant parts, a subject, a reference, dependencies within the content, and the like, from the given content.

Shallow parsing is a term used to describe lexical parsing of a given content using NLP. For example, given a sentence, an NLP engine determining what the sentence semantically means (context) according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

A sentiment of a given content can be determined using NLP. For example, by performing NLP on the content of a post, it can be determined whether the content expresses a favorable or unfavorable sentiment about a subject. As an example, a close friend's post, "I like your hair," can be parsed using NLP to determine that the post has a favorable sentiment towards a person's hair in an image, whereas "Those glasses don't work" post can be parsed using NLP to determine that the post has an unfavorable sentiment towards the eyewear a person might be wearing in an image.

SUMMARY

The illustrative embodiments provide a method, system, and computer program product. An embodiment includes a method that extracts, using a processor and a memory to perform Natural Language Processing (NLP) on a comment to a social media post, an entity that is referenced in the comment, the entity being an object other than a human face that is depicted in an image in the post. The embodiment analyzes the image to determine whether the entity is represented in the image. The embodiment computes, responsive to the entity being represented in the image, a sentiment value of the comment relative to the entity. The embodiment assigns, to a characteristic of a graphical artifact, a value corresponding to the sentiment value. The embodiment determines a position relative to an area occupied by the entity in the image. The embodiment causes the graphical artifact to be overlaid on the image at the position and with the value of the characteristic.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
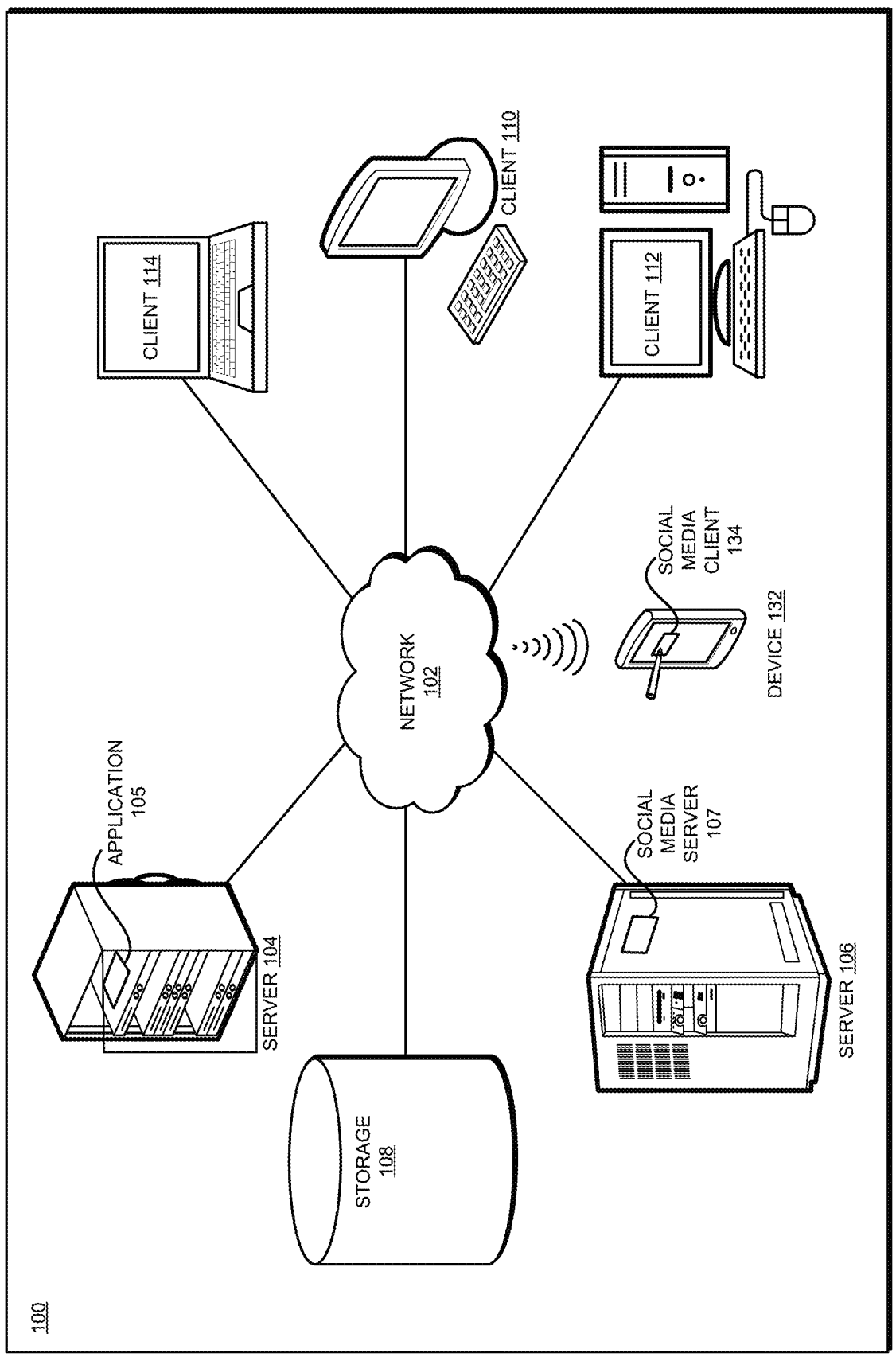
FIG. 1 depicts a block diagram of a network of data processing systems in which illustrative embodiments may be implemented.

Presently, technology exists to tag social media users in the images posted on social media. The presently available social media technology automatically identifies human faces in image posts, performs facial recognition to identify the users whose faces are present in the image, and associates a text overlay with each recognized face. The text overlay is called a tag, which contains the recognized user's social media identifier, and is positioned proximate to the area occupied by the recognized face in the image.

Presently, image libraries are available that include images of a variety of objects. An image in a library is tagged with metadata. The metadata includes keywords that describe the contents of the image. When an image of a certain object is needed, the library can be searched using one or more keywords, and the library returns an image whose metadata includes the searched keywords.

The illustrative embodiments recognize that these presently available technologies are insufficient for relating social media comments to the contents of image posts on social media. For example, the illustrative embodiments recognize that often a comment relates not to a person whose face can be recognized in an image post but to some other non-human entity depicted in the image.

Furthermore, as distinct from curated images in a library, most social media image posts include uncurated pictures that are contributed by social media users. Therefore, the illustrative embodiments recognize that the images in social media posts do not have associated keywords metadata which can be used to identify the entities present in the image.

Additionally, the illustrative embodiments recognize that unlike a keyword based search for images from a library, a comment is not configured with keywords, or even to function as a search. A comment is generally just a natural language expression of a user's thoughts relative to the image in the post. Therefore, the illustrative embodiments recognize that the comment may not even specify the entity using keywords, yet can be related to the entity.

Therefore, the illustrative embodiments recognize that associating a social media comment to an entity in an image of a post is a far more difficult problem than the problems solved using facial recognition or a library search technology. For properly associating the comment to an entity in an image, not only does the context of the comment have to be correctly understood, but the contents of the image have to analyzed in that context to decide whether, how, and where to relate the comment to the image.

The illustrative embodiments used to describe the invention generally address and solve the above-described problems and other problems related to social media comments to entities depicted in image posts.

An embodiment can be implemented as a software application. The application implementing an embodiment can be configured as a modification of an existing social media server, as a separate application that operates in conjunction with an existing social media server, a standalone application, or some combination thereof.

An embodiment detects that a comment is present in a social media post that includes an image. The embodiment analyzes the comment, such as by parsing the comment using NLP as described herein, to extract an entity that is the context of the comment. Note that the entity can be, but need not be expressly specified in the comment. For example, a close friend's comment "you must tell me who your hair stylist is!" is not referencing the hair entity directly, but is indirectly related to the hair entity depicted in the image. The embodiment extracts the entity that is either directly or indirectly related to the comment.

The embodiment analyzes the image using existing image analysis tools to determine whether the extracted entity is present in the image. If the entity is present in the image, the embodiment computes the bounds of the entity within the image. For example, if the entity is the hair of the person, the embodiment determines the pixels that represent the hair of the person in the image. The determined bounds of the entity form the boundary of an area of the image in which the entity is located.

In one embodiment, the boundary includes only the pixels that form the entity. In another embodiment, the boundary approximates the area occupied by the pixels of the entity, e.g., in the form of a geometric shape around the entity, and may also include some pixels that are not a part of the entity.

Within the boundary of the entity, an embodiment further selects a suitable location for placement of one or more annotations. An annotation is a graphical artifact, such as a bubble, a tag, or a marker, which is overlaid on the entity within the boundary to indicate that a comment is related to the entity. Only for the clarity of the description and without implying any limitation thereto, the annotations of various possible types are collectively and interchangeably referred to as bubbles.

The embodiment selects the location for placing a bubble on an entity in the image with certain considerations. For example, one consideration may be that no more than a threshold fraction of the entity should be obscured by the one or more bubbles that occupy the entity's boundary. Another example consideration may be that no more than a threshold fraction of another entity's boundary should be infringed by the one or more bubbles that occupy the entity's boundary. Another example consideration may be that a bubble should not be more than a threshold distance from the boundary of the entity.

Within the scope of the illustrative embodiments, a placement location can be specified relative to the boundary of an entity, relative to a boundary of the image as a whole, relative to a grid applied to the image, using a system of coordinates relative to one or more corners of the image, or using any other suitable referencing method.

These examples of considerations in bubble placement are not intended to be limiting. From this disclosure, those of ordinary skill in the art will be able to conceive many other similarly purposed considerations, and the same are contemplated within the scope of the illustrative embodiments.

A bubble has a set of characteristics. A characteristic of a bubble controls a visual aspect of the bubble such that the visual aspect communicates some information about the relationship of the entity with the comments. Different characteristics of a bubble control different visual aspects of the bubble.

As an example, one example characteristic relates a sentiment of a comment to the entity. An embodiment analyzes a comment to determine a sentiment value of the comment. The embodiment adjusts the characteristic of the bubble according to the sentiment value. For example, if the characteristic controls the color aspect of the bubble, different colors correspond to different sentiment values or ranges of sentiment values. Depending on the sentiment value of the comment, the embodiment selects the corresponding color value for the characteristic.

In some cases, a plurality of comments with a variety of sentiments may be associated with an entity. For example, some comments might indicate a liking sentiment for the hair entity and some comments might indicate a dislike sentiment for the hair entity. An embodiment computes the sentiment value of each comment that is related to the entity. The embodiment computes an overall sentiment value for the plurality of comments. As a non-limiting example, the overall sentiment value of a plurality of comments may be an average, or a statistical mean, or some other function of all or some the individual sentiments values of each individual comment in the plurality. The embodiment uses the overall sentiment value to assign a value to a characteristic of the bubble.

Another example characteristic relates a number of comments that are related to the entity. An embodiment counts the number of comments that directly or indirectly use the entity as the context. The embodiment assigns the number of comments as the value of the characteristic of the bubble.

Another example characteristic relates a number of users who have commented in relation to the entity. A user can comment more than one time in relation to the entity. An embodiment counts the number of commentators that directly or indirectly use the entity as the context in their comments. The embodiment assigns the number of commentators as the value of the characteristic of the bubble.

Another example characteristic relates a number of comments that are related to the entity versus the total number of comments related to the image. An embodiment computes a ratio of the number of comments that directly or indirectly use the entity as the context and the number of comments that are related to some entity in the image. The embodiment assigns the ratio as the value of the characteristic of the bubble.

Generally, any suitable characteristic can be included in the set of characteristics associated with a bubble. Generally, a characteristic can be visually manifested in any suitable manner in the bubble, including but not limited to a color, a texture, a size, a shape, alphanumeric lettering, a font, a blink rate, an animation, and an opacity used in depicting the bubble overlay.

Once an embodiment has configured a bubble with one or more characteristics relating one or more comments to an entity in an image, the embodiment constructs an instruction to overlay the configured bubble. The embodiment sends the instruction to a social media server, which configures the bubble according to the configuration, positions the bubble at the computed placement location relative to the entity, and renders the bubble overlay over the image in the image post.

Comments can be added or updated in a post indefinitely. An embodiment detects new or updated comments in an image post. The embodiment constructs new bubbles when new entities are related to the new or updated comments. The embodiment updates an existing bubble when an existing entity is referenced by a new or updated comment.

A method of an embodiment described herein, when implemented to execute on a device or data processing system, comprises substantial advancement of the functionality of that device or data processing system in automatically relating social media comments to entities present in an image post. For example, presently available methods either only detect human faces or use image metadata to search for images with other objects. An embodiment provides a method for automatically determining a contextual relationship between a natural language comment and an entity in an image, where the image need not have any metadata for this purpose. An embodiment analyzes the image to determine whether the entity is present in the image; the entity is an object other than a human face. An embodiment further automatically detects a sentiment of the comment and characterizes a bubble overlay on the entity. This manner of sentiment based social media comment overlay on image posts is unavailable in the presently available methods. Thus, a substantial advancement of such devices or data processing systems by executing a method of an embodiment is in dynamically and automatically maintaining a visual relationship between entities in an image post and the comments that reference those entities either directly or indirectly.

The illustrative embodiments are described with respect to certain types of social media services, posts, images, comments, analyses, sentiments, values, bubbles, characteristics, locations, boundaries, placements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
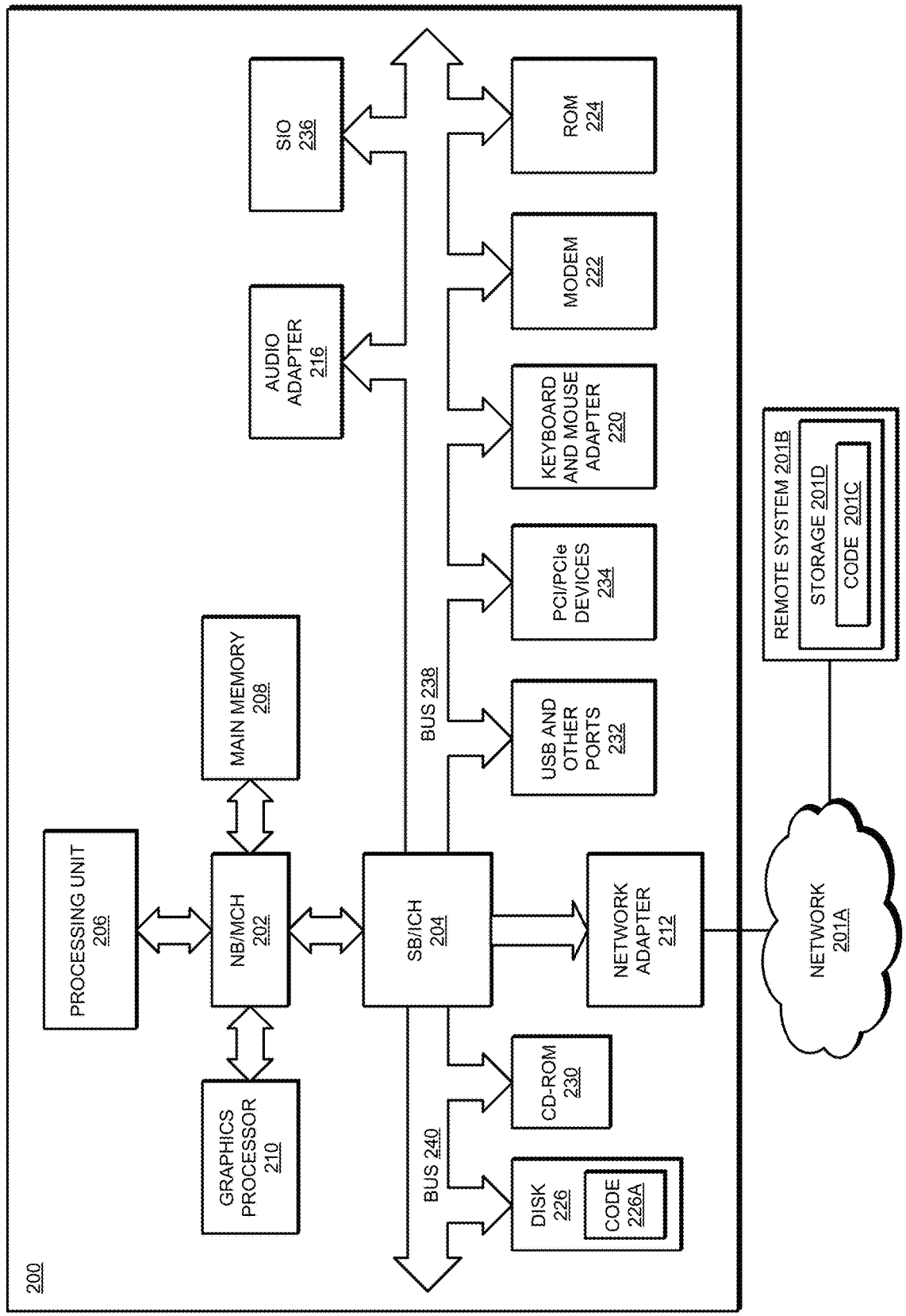
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. A user uses social media client application 134 to interact with social media server 107, such as to post an image or to comment on an image post. Application 105 receives social media data—e.g., image contents of a post, comments made to an image post, information about the commentators, and the like, from social media server 107. Application 105 computes and provides one or more instructions to social media server 107 to construct, place, and/or update a bubble, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
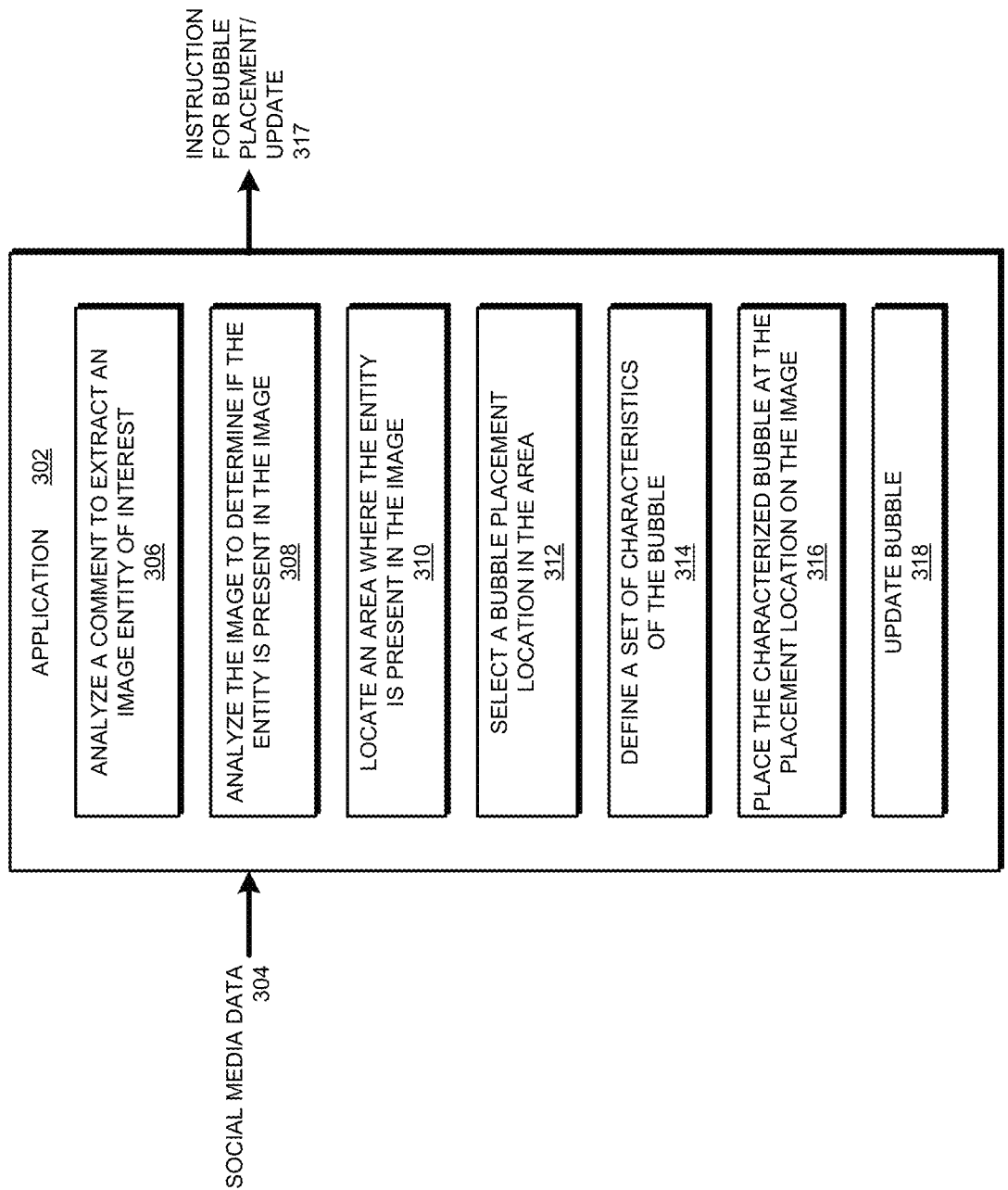
FIG. 3 depicts a block diagram of an example configuration for sentiment based social media comment overlay on image posts in accordance with an illustrative embodiment.

With reference to FIG. 3, this figure depicts a block diagram of an example configuration for sentiment based social media comment overlay on image posts in accordance with an illustrative embodiment. Application 302 is an example of application 105 in FIG. 1. Social media server 107 in FIG. 1 provides social media data 304, which includes data items as described herein.

Component 306 determines that a comment is present, has been added, or has been updated in an image post. Component 306 analyzes the comment to extract an entity that is the context of the comment. In other words, the entity is the entity of interest in the comment.

Component 308 analyzes the image in the post to determine whether the entity of interest is present in the image. If the entity is present, component 310 locates an area where the entity is present in the image.

Component 312 selects a bubble placement location in the area. Component 312 uses one or more considerations in the placement, as described herein.

Component 314 defines a set of characteristics of the bubble. Specifically, component 314 assigns a value to a characteristic according to a sentiment of the comment in a manner described herein. Component 314 may optionally assign values to one or more other characteristics of the bubble corresponding to the example computations described herein, or other similarly purposed implementation-specific computations.

Component 316 places the characterized bubble, to wit, the bubble with the defined characteristics, at the placement location on the image. In one embodiment, component 316 performs the placement manipulation in the image post. In another embodiment, component 316 constructs one or more instructions 317 for the placement of the characterized bubble on the image and transmits instructions 317 to the social media server.

Component 318 checks for new comments or updates to old comments. When new or updated comments are found in the image post, component 318 triggers the operations described herein for adding or updating bubble overlays.

Figure 4:
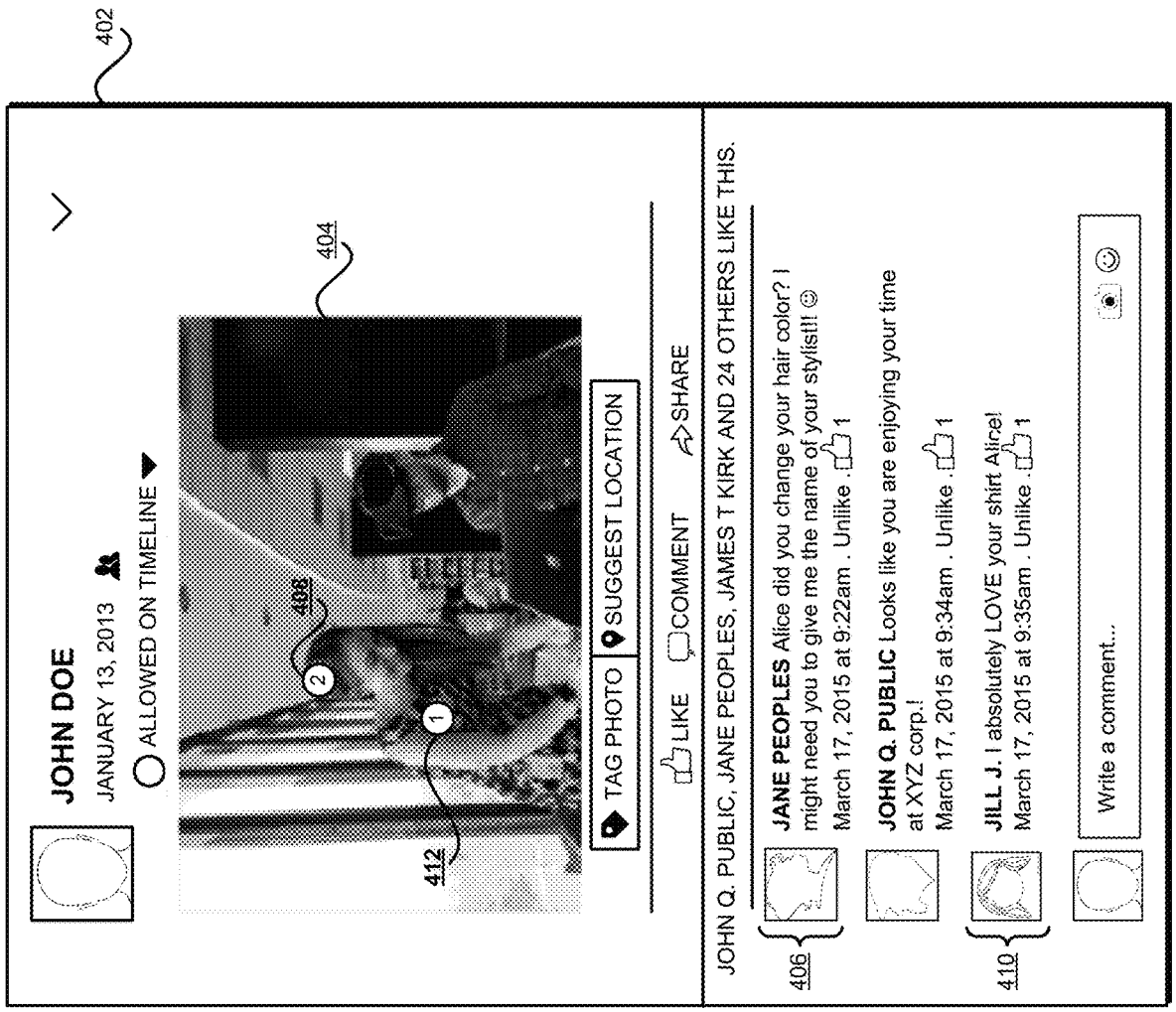
FIG. 4 depicts an example operation of sentiment based social media comment overlay on image posts in accordance with an illustrative embodiment.

With reference to FIG. 4, this figure depicts an example operation of sentiment based social media comment overlay on image posts in accordance with an illustrative embodiment. Social media server 107 in FIG. 1 presents post 402 on social media client application 134 in FIG. 1. Post 402 is an image post for including image 404.

Comments 406 and 408 are some example comments that reference entities in image 404. For example, application 302 of FIG. 3 analyzes comment 406 to determine that comment 406 is in the context of the hair entity of the female human depicted in image 404. For example, NLP analysis of a close friend's comment 406 finds that the terms "hair color" "stylist" and "Alice" in comment 406 support the conclusion that comment 406 is in the context of the hair entity of the female human depicted in image 404. Furthermore, the sentiment analysis of comment 406 computes to a favorable sentiment expressed in comment 406 towards the hair entity.

Suppose that there is another comment (not shown) that also favorably refers to the same hair entity. Accordingly, the application identifies the area occupied by the hair entity of the female human in image 404 and determines a placement of bubble 408 within or proximate to the area occupied by the hair entity.

Due to the limitation of the black and white patent drawings, color characteristics of the bubbles are depicted using shading fills in the bubbles. Suppose that because of the favorable sentiments of two comments, one of which is comment 406, bubble 408 is depicted to have a green color characteristic, which in FIG. 4 is represented as clear white color of bubble 408. Furthermore, because two comments are referencing the hair entity, the number "2" in bubble 408 is the numerosity of comments characteristic of bubble 408.

Similarly, NLP analysis of a close friend's comment 410 finds that the terms "love" "shirt" and "Alice" in comment 410 support the conclusion that comment 410 is in the context of the clothing entity of the female human depicted in image 404. Furthermore, the sentiment analysis of comment 410 computes to a favorable sentiment expressed in comment 410 towards the clothing entity.

Accordingly, the application identifies the area occupied by the clothing entity of the female human in image 404 and determines a placement of bubble 412 within or proximate to the area occupied by the clothing entity.

For the reasons described above, because of the favorable sentiments of comment 410, bubble 412 is depicted to have a green color characteristic, which in FIG. 4 is represented as clear white color of bubble 412. Furthermore, because one comment is referencing the clothing entity, the number "1" in bubble 412 is the numerosity of comments characteristic of bubble 412.

Figure 5:
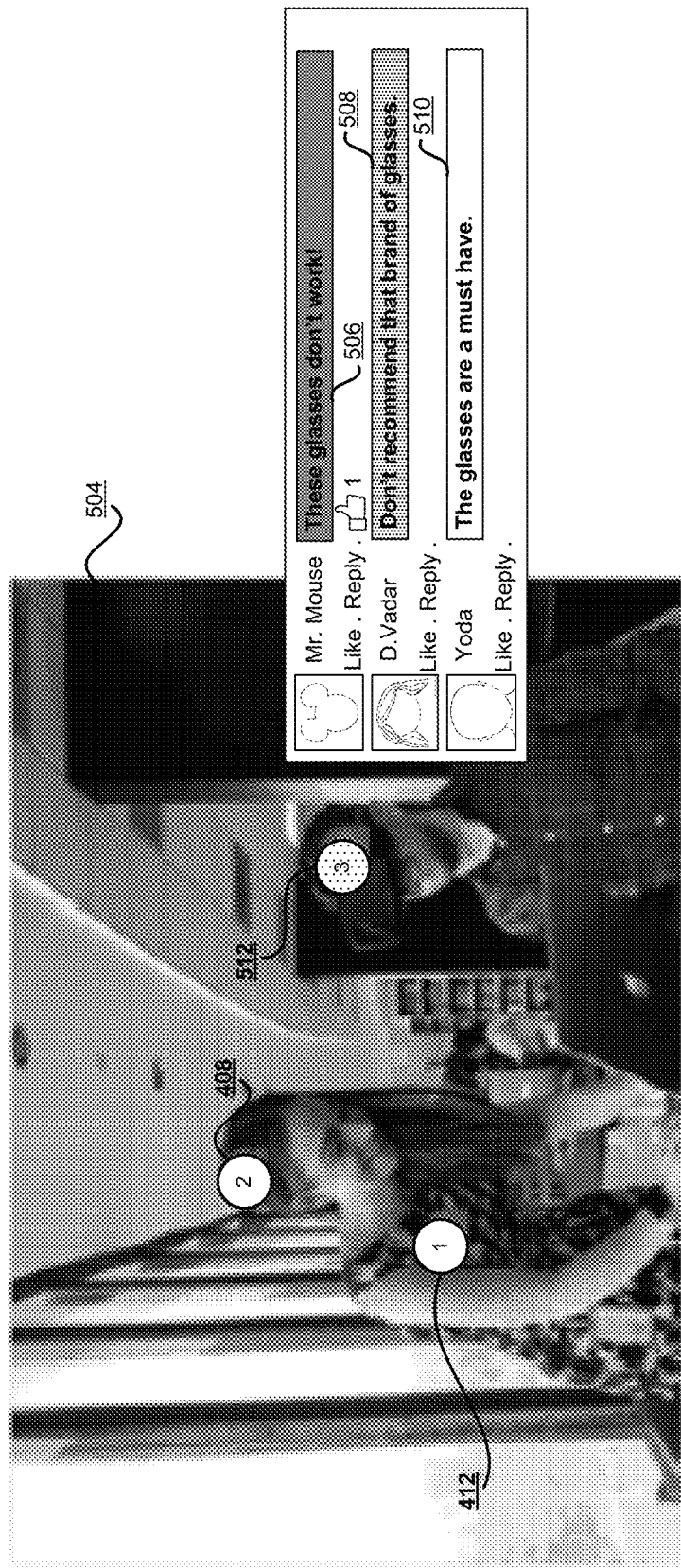
FIG. 5 depicts a block diagram of another example operation for sentiment based social media comment overlay on image posts in accordance with an illustrative embodiment.

With reference to FIG. 5, this figure depicts a block diagram of another example operation for sentiment based social media comment overlay on image posts in accordance with an illustrative embodiment. Image 504 is an image that appears in a social media post in a manner similar to image 404 in post 402 of FIG. 4. Bubbles 408 and 410 are the same as bubbles 408 and 412, respectively, in FIG. 4.

Now suppose that additional comments are present in the post that are in the context of the eyewear worn by the male human in image 504. Application 302 in FIG. 3 analyzes comment 506 to determine that the context of comment 506 is the eyewear entity of the male human in image 504, and the sentiment of comment 506 is unfavorable, exceeding a threshold unfavorability on an unfavorability scale. Similarly, the analysis determines that comment 508 is also in the context of comment 506 is the eyewear entity of the male human in image 504, and the sentiment of comment 506 is unfavorable, but does not exceed the threshold unfavorability on an unfavorability scale.

The analysis further determines that comment 510 is also in the context of the eyewear entity of the male human in image 504, and the sentiment of comment 510 is favorable, exceeding a threshold favorability on a favorability scale. Accordingly, the application computes an overall sentiment of comments 506, 508, and 510, and finds that the overall sentiment is slightly negative.

The application identifies the area occupied by the eyewear entity of the male human in image 504 and determines a placement of bubble 512 within or proximate to the area occupied by the eyewear entity.

For the reasons described above, because of the slightly unfavorable sentiments of the set of comments 506-510, bubble 512 is depicted to have an orange color characteristic, which in FIG. 5 is represented as a shaded pattern fill of bubble 512. Furthermore, because three comments are referencing the eyewear entity, the number "3" in bubble 512 is the numerosity of comments characteristic of bubble 512.

According to one embodiment, the application also color-codes the comments according to the sentiment expressed in the comments towards a referenced entity. For example, due to a greater than threshold unfavorability sentiment, comment 506 is colored red (depicted as heavy pattern fill in the text box of comment 506); due to a less than threshold unfavorability sentiment, comment 508 is colored deep orange (depicted as medium pattern fill in the text box of comment 508); and due to a greater than threshold favorability sentiment, comment 510 is colored green (depicted as clear white fill in the text box of comment 510).

Only for the clarity of the depictions and not to imply any limitations thereto, only certain characteristics of the bubbles are depicted in FIGS. 4 and 5. More or different characteristics can similarly be depicted in the bubbles in a manner described herein within the scope of the illustrative embodiments.

Furthermore, only for the clarity of the depictions and not to imply any limitations thereto, only certain ways of visually depicting the characteristics of the bubbles are used in FIGS. 4 and 5. More or different ways of visually depicting the various characteristics can similarly be used within the scope of the illustrative embodiments.

Figure 6:
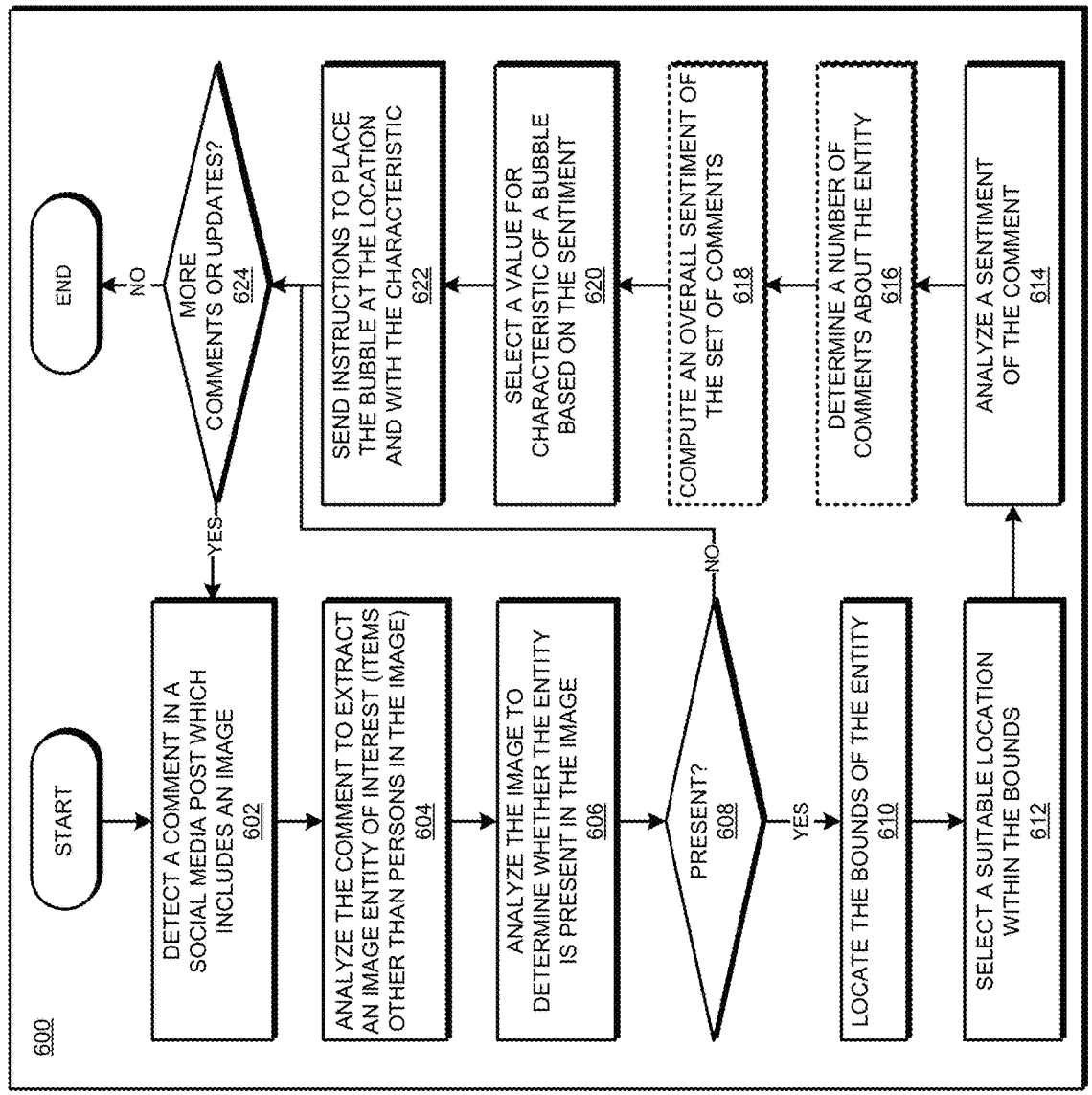
FIG. 6 depicts a flowchart of an example process for sentiment based social media comment overlay on image posts in accordance with an illustrative embodiment.

With reference to FIG. 6, this figure depicts a flowchart of an example process for sentiment based social media comment overlay on image posts in accordance with an illustrative embodiment. Process 600 can be implemented in application 302 in FIG. 3.

The application detects a comment in a social media post which includes an image (block 602). The application analyzes the comment to extract an image entity of interest (block 604).

The application analyzes the image in the post to determine whether the entity of interest is present in the image (block 606). If the entity is not present ("No" path of block 608), the application proceeds to block 624.

If the entity is present in the image ("Yes" path of block 608), the application locates the bounds of the entity in the image (block 610). The application selects a suitable location with the bounds for placing a bubble (block 612).

The application analyzes a sentiment of the comment (block 614). When multiple comments use the entity as the context, the application determines a number of comments that use the entity as the context (block 616). The application computes an overall sentiment towards the entity in the set of comments (block 618).

The application selects a value for a characteristic of a bubble based on the computed sentiment in block 614 or block 618 (block 620). The application may optionally select (not shown) other values for one or more other characteristics of the bubble as well. The application sends an instruction to place the characterized bubble at the location relative to the entity (block 622).

The application determines whether more comments have been added or a comment has been updated relative to the post (block 624). If a new or updated comment is available ("Yes" path of block 624), the application returns to block 602. If a new or updated comment is not available ("No" path of block 624), the application ends process 600 thereafter.

Thus, a computer implemented method, system or apparatus, and computer program product are provided in the illustrative embodiments for sentiment based social media comment overlay on image posts and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

extracting, using a processor and a memory to perform Natural Language Processing (NLP) on a comment to a social media post, an entity that is referenced in the comment, the entity being an object other than a human face that is depicted in an image in the post;

computing a sentiment value of the comment relative to the entity;

assigning, to a characteristic of a graphical artifact, a value corresponding to an overall sentiment value, the overall sentiment value comprising the sentiment value and a second sentiment value from a second comment; and causing the graphical artifact to be overlaid on the image at a position of the entity and with the value of the characteristic.

2. The method of claim 1, further comprising:

locating, responsive to the entity being represented in the image, an area occupied by the entity in the image, the position being relative to the area.

3. The method of claim 2, wherein the area comprises: only the pixels that form the entity.

4. The method of claim 1, wherein the value of the characteristic is a color of the graphical artifact.

5. The method of claim 1, further comprising:

assigning, to a second characteristic of the graphical artifact, a second value, the second value corresponding to a number of comments in the post that refer to the entity.

6. The method of claim 1, further comprising:

assigning, to a second characteristic of the graphical artifact, a second value, the second value corresponding to a number of commentators who have supplied comments in the post, wherein the comments refer to the entity.

7. The method of claim 1, further comprising:
determining that a set of comments references the entity, the set including the comment and the second comment.

8. The method of claim 7, further comprising:
averaging, as a part of the combining, the sentiment value and the second sentiment value.

9. The method of claim 1, further comprising:
performing image analysis, as a part of the determining whether the entity is represented in the image is accomplished, without relying on a keyword in a metadata of the image.

10. The method of claim 1, wherein the comment is an update to an existing comment.

11. The method of claim 1, wherein the entity is referenced in the comment indirectly without identifying the entity.

12. A computer usable program product comprising one or more computer-readable storage devices, and program instructions stored on at least one of the one or more storage devices, the stored program instructions comprising:
program instructions to extract, using a processor and a memory to perform Natural Language Processing (NLP) on a comment to a social media post, an entity that is referenced in the comment, the entity being an object other than a human face that is depicted in an image in the post;
program instructions to compute a sentiment value of the comment relative to the entity;
program instructions to assign, to a characteristic of a graphical artifact, a value corresponding to an overall sentiment value, the overall sentiment value comprising the sentiment value and a second sentiment value from a second comment; and
program instructions to cause the graphical artifact to be overlaid on the image at a position of the entity and with the value of the characteristic.

13. The computer usable program product of claim 12, further comprising:
program instructions to locate, responsive to the entity being represented in the image, an area occupied by the entity in the image, the position being relative to the area.

14. The computer usable program product of claim 12, wherein the area comprises:
only the pixels that form the entity.

15. The computer usable program product of claim 12, wherein the value of the characteristic is a color of the graphical artifact.

16. The computer usable program product of claim 12, further comprising:
program instructions to assign, to a second characteristic of the graphical artifact, a second value, the second value corresponding to a number of comments in the post that refer to the entity.

17. The computer usable program product of claim 12, further comprising:
program instructions to assign, to a second characteristic of the graphical artifact, a second value, the second value corresponding to a number of commentators who have supplied comments in the post, wherein the comments refer to the entity.

18. The computer usable program product of claim 12, wherein the stored program instructions are stored in a computer readable storage device in a data processing system, and wherein the stored program instructions are transferred over a network from a remote data processing system to the data processing system.

19. The computer usable program product of claim 12, wherein the stored program instructions are stored in a computer readable storage device in a server data processing system, and wherein the stored program instructions are downloaded over a network from the server data processing system to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to extract, using a processor and a memory to perform Natural Language Processing (NLP) on a comment to a social media post, an entity that is referenced in the comment, the entity being an object other than a human face that is depicted in an image in the post;
program instructions to compute a sentiment value of the comment relative to the entity;
program instructions to assign, to a characteristic of a graphical artifact, a value corresponding to an overall sentiment value, the overall sentiment value comprising the sentiment value and a second sentiment value from a second comment; and
program instructions to cause the graphical artifact to be overlaid on the image at a position of the entity and with the value of the characteristic.

* * * * *